United States Patent [19]

Singer et al.

[11] Patent Number: 4,855,156
[45] Date of Patent: Aug. 8, 1989

[54] FROZEN DESSERT

[75] Inventors: Norman Singer, Highland Park, Ill.; Reed Wilcox, Littleton, Colo.; Joseph S. Podolski, Skokie, Ill.

[73] Assignee: The NutraSweet Company, Deerfield, Ill.

[21] Appl. No.: 148,434

[22] Filed: Jan. 26, 1988

[51] Int. Cl.$^4$ .......................... A23G 9/00; A23G 9/02
[52] U.S. Cl. ..................................... 426/565; 426/566; 426/567; 426/804; 426/570; 426/583
[58] Field of Search ............... 426/564, 565, 566, 567, 426/570, 613, 804, 583

[56] References Cited

U.S. PATENT DOCUMENTS

| | | | |
|---|---|---|---|
| 3,510,316 | 5/1970 | Decher | 426/565 |
| 3,556,813 | 1/1971 | Creswick | 426/567 |
| 4,308,294 | 12/1981 | Rispoli et al. | 426/564 |
| 4,400,405 | 8/1983 | Morley | 426/804 |
| 4,510,166 | 4/1985 | Lenchin et al. | 426/565 |
| 4,552,773 | 11/1985 | Kahn et al. | 426/564 |
| 4,631,196 | 12/1986 | Zeller | 426/565 |
| 4,734,287 | 7/1986 | Singer et al. | |

OTHER PUBLICATIONS

Abd El-Salam et al., *J. Dairy Res.*, 52, 299-301 (1985).
Berger et al., *J. Fd. Technol.*, 6, 285-294 (1971).
Brunner, "Milk Proteins", in *Food Proteins*, 175-207 (1977), ed, by J. F. Whitaker et al., AVI Publishing Co. Westport, CT.
Buchheim, Elektronmikroskopische Darstellung der Struktur von Speiseels, Susswaren, 16, 763-767 (1970) (Translation Attached).
Buchheim, *Scanning Electron Microscopy*, III, 193-202 (1981), SEM Inc., AMF O'Hare (Chicago).
Buma et al., *Neth. Milk Dairy J.*, 25, 75-80 (1971).
Caloianu et al., *Egyptian J. Dairy Sci.*, 8, 151-161 (1980).
Carroll et al., *Food Microstructure*, 4, 323-331 (1985), SEM Inc., AMF O'Hare (Chicago).
Chang et al., *J. Inst. Can. Sci. Technol. Aliment*, 5(3), 134-138 (1972).
Cohen et al., (eds.), *Studies of Food Microstructure*, Scanning Electron Microscopy, Inc., O'Hare, Ill. (1981), Title page and Table Of Contents only.
Cohn et al., *J. Biol. Chem.*, 109, 169-175 (1935).
Creamer et al., *New Zealand Journal of Dairy Science & Technol.*, 13, 9-15 (1978).
Davies et al., *J. Dairy Res.*, 50, 67-75 (1983).
Davies et al., *J. Dairy Res.*, 45, 53-58 (1978).
*Documentia Geigy*, Ed., by K. Diem et al., Geigy Pharmaceuticals, 510-511 (1970).
El Shabrawy et al., *Annals Agric. Sci., Fac. Agric.*, Ain--Shams Univ., Cairo, Egypt, 29(2), 747-753 (1984).
El-Shabrawy, *Egypt J. Food Sci.*, 14(2), 283-188 (1986) (Abstract).
Gouda et al., *Annals Agric. Sci., Fac. Agric.*, Ain-Shams Univ., Cairo, Egypt, 29(2), 755-762 (1984).
Green et al., *J. Dairy Res.*, 50, 341-348 (1983).
Heertje et al., *Neth. Milk Dairy J.*, 35, 177-179 (1981).
Holt, *Food Microstructure*, 4, 1-10, (1985), SEM Inc., AMF O'Hare (Chicago).
Hood et al., *J. Food Science*, 39, 117-120 (1974).
Kalab, *J. Dairy Sci.*, 62(8), 1352-1364 (1979).
Kalab, *Int'l. Dairy Congress Proc.*, 990-991 (1978).
Kalab et al., *Food Microstructure*, 2, 51-66 (1983), SEM Inc., AMF O'Hare (Chicago).
Kalab, *Scanning Electron Microscopy*, III, 261-272 (1979), SEM Inc., AMF O'Hare (Chicago).
Kalab et al., *Milchwissenschaft*, 31(7), 402-408 (1976).
Kalab et al., *J. Dairy Sci.*, 56(7), 835-842 (1972).
Kalab et al., *Scanning Electron Microscopy*, III, 153-162 (1981), SEM Inc., AMF O'Hare (Chicago).
Kimura et al., *J. Electron Microscopy*, 24(2), 115-117 (1975).
Kimura et al., *Int'l. Dairy Congress Proc.*, 239-240 (1978).
Kimura et al., *Int'l. Dairy Congress Proc.*, 238 (1978).
McMahon et al., *J. Dairy Sci.*, 67, 499-512 (1984).
Mohammed et al., *N.Z. J. Dairy Sci. & Technol.*, 22, 191-203 (1987).
Morr, "Conformation and Functionality of Milk Proteins", in *Functionality & Protein Structures*, ed., by A. Pour-El, 65-79, American Chemical Society, Washington (1979).
Morr, *Kieler Milchw. Forschung*, 35(3), 333-343 (1983).
Omar, *Food Chemistry*, 25, 183-196 (1987).
Omar et al., *Food Chemistry*, 22, 147-163 (1986).
Omar, *Food Chemistry*, 15, 19-29 (1984).
Omar, *Die Nahrung*, 29, 119-124 (1985).
Pao et al., USDA, Human Nutrition Information Science, *Home Economics Research Report* No. 44, pp. 1-21, 44-45, 296-297, 312-313, 330-331, 336-337, 352-353 (1982).
Ray et al., *Scanning Electron Microscopy*, 99-104 (1981), SEM Inc., AMF O'Hare (Chicago).
Rose et al., *J. Dairy Sci.*, 49, 1091-1097 (1966).
Ruettimann et al., *Enzyme Microb. Technol.*, 9, 578-589 (1987).
Schmidt et al., *Neth. Milk Dairy J.*, 27, 128-142 (1973).
Tamime et al., *Food Microstructure*, 3, 83-92 (1984), SEM Inc., AMF O'Hare (Chicago).
Tung et al., *Scanning Electron Microscopy*, 231-238 (1981), SEM Inc., AMF O'Hare (Chicago).
United States Dept. of Agriculture: *Nutrition Monitoring in the U.S.*, U.S. DHHS, U.S. DOA., Hyattsville, MD., Jul. 1986.
Wolf et al., *Cereal Chem.*, 52, 387-396 (1975).
Wolf et al., *Scanning Electron Microscopy*, III, 239-252 (1981), SEM Inc., AMF O'Hare (Chicago).

*Primary Examiner*—Jeanette Hunter
*Attorney, Agent, or Firm*—Marshall, O'Toole, Gerstein, Murray & Bicknell

[57] ABSTRACT

Non-fat and reduced fat whipped frozen dessert products wherein part or all of the milk fat, vegetable fat or oil ordinarily incorporated therein is replaced by a proteinaceous macrocolloid of, e.g., denatured whey protein particles. Illustrative embodiments include non-fat ice cream analog products having reduced calorie content, enhanced food value due to increased protein content, and possessing the physical and organoleptic character of full fat ice creams.

13 Claims, No Drawings

FROZEN DESSERT

FIELD AND BACKGROUND OF THE INVENTION

This is a continuation-in-part of co-pending U.S. Pat. application Ser. No. 127,709, filed Dec. 2, 1987.

The present invention relates generally to frozen dessert products and more particularly to non-fat and reduced-fat products which possess the organoleptic characteristics of full fat-containing ice cream and related frozen dairy desserts.

"Frozen dessert" is a generic term applied to a wide variety of products including ice cream, frozen custard, ice milk, sherbert, water ice, frozen dairy confections, frozen confections, dietary frozen desserts, Mellorine and non-dairy desserts, all of which are defined according to U.S. Government Federal Standards of identity. Frozen dessert products for which no Federal Standards exist include frozen puddings, mousse and frozen shakes. Among the "dairy" frozen desserts minimum standards exist for milk fat and/or milk solids content. For example, ice cream must contain not less than 10% milk fat and 20% total milk solids (comprised of the total of milk fat and Milk Solids Non-Fat, "MSNF"); ice milk must contain 2 to 7% milk fat and not less than 11% total milk solids; and sherbert must contain 1 to 2% milk fat and 2 to 5% total milk solids. See, generally, Redfern, R. S. and Arbuckle, W. S., "Ice Cream Technology Manual", 4th Ed., 1985, Redfern & Assoc. Ltd., Raleigh, N.C. 27622, the disclosures of which are incorporated by reference herein for purposes of establishing the background of the invention.

Ice creams and other whipped frozen dairy desserts are actually rather complicated foams consisting of air bubbles surrounded by a partly frozen emulsion wherein ice crystals and solidified fat globules are embedded in the unfrozen water phase. Estimates of the sizes of the coarsely dispersed structural components of ice cream vary. Ice crystal sizes are reported to vary in size between 20 to 60$\mu$ in diameter and to be situated approximately 7$\mu$ apart; air cells are reported to range in size between 10 to 175$\mu$ and to be situated about 125$\mu$ apart; and solidified fat globules are reported to vary in size from 0.2 to 2.0$\mu$ and to form agglomerations providings a "skin" around trapped air cells. See, "Fundamentals of Dairy Chemistry", 2nd Ed., 1983, Webb, B. H., et al., eds., Avi Publishing Company, Inc., Westport, Conn., at pages 896–913, the disclosures of which are incorporated by reference herein for purposes of establishing the background of the invention.

It is well known that the fat content of frozen dairy desserts plays a substantial role not only in the body and texture of the product, but also its flavor characteristics. Smothness of ice cream texture is essentially inversely proportional to the average size of ice crystals. Increases in the milk fat content for virtually any given frozen dessert formulation will both decrease the ice crystal size and the distance between crystals. Despite the expense and high caloric value attending use of milk fat, as well as the susceptibility of milk fat to oxidation causing off flavors and its propensity to provide whipped or buttery texture effects, full fat ice cream products are generally more widely preferred to ice milk, sherbets and the like. Indeed, the so-called "premium grade" ice creams are essentially characterized by higher than standard milk fat contents in the range of 15 to 18% and are recognized as products of correspondingly increased palatability and smoothness and enhanced body and texture in comparison to standard grade ice cream and dairy dessert products having lower fat contents.

While attempts have been made to develop frozen dessert product formulations wherein part or all of the milk fat content ordinarily present is replaced by a non-fat material, none of the resulting products has achieved any substantial success as a replacement for full fat ice cream or ice milk. See, for example, U.S. Pat. No. 4,510,166 relating to ice cream formulations wherein starch gels are suggested as fat replacement materials and U.S. Pat. Nos. 4,421,778 and 4,552,773 relating to whipped food products incorporating beta-phase tending crystalline fats. See also, British Pat. Nos. 915,389 and 3,510,316, 3,556,813, 4,400,405, and 4,631,196.

There thus continues to exist a long standing need in the art for non-fat and reduced fat frozen dessert products which possess the physical and organoleptic characteristics of full fat frozen dairy desserts. Ideally, such products would equal or surpass standard frozen whipped dessert products in nutritional value but have reduced caloric content.

BRIEF SUMMARY

According to the present invention, non-fat and reduced fat whipped frozen dessert products are provided wherein part or, preferably, all of the milk fat, vegetable fat, or oil ordinarily incorporated therein is replaced by a proteinaceous macrocolloid of denatured protein particles. Products of the invention possess the physical and organoleptic characteristics of full fat products despite the absence or substantially reduced content of fat/oil droplets or globules which are known to play a critical role in air cell formation and in the development and maintenance of low average ice crystal size in frozen whipped desserts. The ability to partially or totally replace fats or oils with proteinaceous macrocolloid materials gives rise to highly desirable products with reduced caloric contents but very high nutritional content owing to the presence of additional protein. The manufacture of frozen dessert products according to the invention requires no equipment or handling other than that ordinarily employed in the preparation of frozen dairy desserts and in all instances the proteinaceous macrocolloid may be incorporated into dessert formulations as a direct replacement for milk fat or vegetable fats or oils.

According to one of its aspects, the present invention provides improved frozen whipped dessert foodstuffs wherein the improvement comprises the partial or total replacement of fat in premix formulations by a macrocolloid comprising substantially non-aggregated particles of denatured protein having in a dry state a mean diameter particle size distribution ranging from about 0.1 microns to about 2.0 microns, with less than about 2 percent of the total number of particles exceeding 3.0 microns in diameter, and wherein the majority of the said particles are generally spheroidal as viewed at about 800 power magnification under a standard light microscope, the particles in a hydrated state forming said macrocolloid having substantially smooth, emulsion-like organoleptic character. Preferred products of the invention comprise frozen whipped desserts of the type which would ordinarily contain milk fat and wherein the protein macrocolloid totally replaces the fat ordinarily present, providing, for example, ice cream analog products having the physical properties and organoleptic character of premium grade ice cream products but containing less than about one percent fat.

Presently preferred proteinaceous macrocolloids for use in practice of the invention are derived from undenatured substantially soluble proteins derived from animal, vegetable and microbial sources, with dairy whey, egg white albumen, soy and bovine serum albumin protein sources being presently most preferred. Desired macrocolloids are of the type described in allowed U.S. Pat. application Ser. No. 606,959, filed May 4, 1984 by Singer et al., and in U.S. Pat. application Ser. No. 127,955, filed Dec. 2, 1987 as a continuation-in-part thereof, both incorporated by reference herein. Macrocolloid products for use in practice of the present invention are suitably prepared through use of apparatus as described in co-owned, co-pending, U.S. Pat. application Ser. No. 127,710, filed Dec. 2, 1987 by Singer et al., entitled "Fluid Processor Apparatus", the disclosures of which are specifically incorporated by reference herein, but may be prepared through use of any suitable apparatus capable of imparting controlled heat and high shear conditions to the starting material protein solution undergoing macrocolloid-forming treatment. Where it is desired to employ dairy whey as the starting material for formation of a proteinaceous macrocolloid for use in a frozen dessert of the present invention and where it is desired to reduce cholesterol and lipid content of the proteinaceous starting material, pre-treatment may be accomplished according to the methods described in co-owned, co-pending, U.S. Pat. application Ser. No. 127,402, filed Dec. 2, 1987 by Singer et al., entitled, "Methods for Extraction of Cholesterol and Lipids" which is incorporated by reference herein.

In another of its aspects, the present invention provides novel methods for preparing reduced calorie whipped frozen dessert products, especially dairy dessert products such as ice cream, ice milk, sherbert and the like, which methods involve the step of replacing the fat and/or oil employed in the product with a prefabricated proteinaceous macrocolloid as described above. Preferably at least 50% of the fat and/or oil is replaced and most preferably the entirety is replaced, leaving a fat content which essentially comprises only such fats as are present in standard flavorings such as cocoa or other fat-containing ingredients such as egg yolk solids in frozen custard products.

In still another of its aspects, the present invention provides for the preparation of reduced calorie whipped frozen dessert products wherein fat-free or substantially fat-free premixes are provided which include heat coagulable protein sources such as egg white, whey protein, soy protein and the like. Upon subjecting these premixes to heat treatment (e.g., pasteurization processing) and relatively high shear blending prior to freeze processing, particles of denatured protein are formed, in situ, in the mix and particles so formed act as a replacement for fat/oil globules in the final frozen dessert product. Premixes prepared according to the invention are characterized by protein contents ranging from about 5 to about 20 percent (and preferably about 7.5 to about 12.5 percent), with from about 25 to about 100 (and preferably about 50) percent of the total protein incorporated comprising heat coagulable protein. Continuous process pasteurization at high temperatures for correspondingly shorter durations (e.g., 20–25 seconds at 176° F.) has been found to provide for the most desirable final products.

Whether prepared by direct incorporation of macrocolloid materials or by in situ formation of protein particles in a premix, preferred frozen whipped dessert products of the invention preferably include denatured protein particles in the size range of about 0.01 to about 3.0 (and preferably about 0.1 to about 2.5) microns in diameter and wherein particles having diameters in the range of from about 0.5 to 2.5 microns are present in quantities of at least $1 \times 10^8$ particles per cubic centimeter of the final product. It is generally preferred that there be from $1 \times 10^8$ to $1 \times 10^{12}$ such particles and most preferred that there be in excess of $1 \times 10^9$ such particles, allowing for the final products to closely approximate full fat products in terms of creaminess, smoothness and overall texture.

It is correspondingly within the ambit of the present invention to prepare fat-free or subtantially fat-free premixes for frozen whipped desserts which comprise from 5 to 20 percent protein wherein from 25 to 100 percent of the total protein is heat coagulable and to subject such premixes to heat pasteurization and high shear blending to develop therein a population of at least $1 \times 10^8$ particles per cubic centimeter of denatured protein particles having diameters of from 0.5 to 2.5 microns. Premixes so constituted provide, upon "finishing" in conventional automatic ice cream mixing/freezing apparatus, ice cream analog products having the textural characteristics of full fat ice creams, ice milks and the like.

Other aspects and advantages of the invention will be readily understood upon consideration of the following detailed description of illustrative embodiments thereof.

DETAILED DESCRIPTION

It has been determined according to the present invention that proteinaceous water-dispersible macrocolloids which may be produced from a variety of protein materials and which in a hydrated state have a substantially smooth, emulsion-like, organoleptic character may be employed as a fat and/or oil replacement in whipped frozen dessert products such as ice cream. The proteinaceous, water-dispersible macrocolloids are comprised of substantially non-aggregated particles of denatured protein which are characterized by having in a dry state a mean diameter particle size distribution ranging from about 0.1 microns to about 2.0 microns, with less than about 2 percent of the total number of particles exceeding 3.0 microns in diameter. The particles are further characterized by being generally spheroidal as viewed at about 800 power magnification under a standard light microscope.

The macrocolloid materials may be produced by controlled denaturation from a wide variety of proteinaceous starting materials which, before processing, are substantially soluble in water and are substantially undenatured.

The particularly desired organoleptic qualities of the macrocolloid materials employed according to the present invention are particularly dependent upon the sizes and shapes of the macrocolloid particles.

Specifically, it has also been found that dispersions of larger, denatured protein coagulates (i.e., with diameters greater than about 3 microns when dried) impart an undesirable chalky mouth feel. This chalkiness can be identified as being a less coarse variant of the gritty mouth feel of known heat denatured proteins (about 15–175 microns). It appears that a sharply defined perceptual threshold is crossed as the number of particles of protein coagulate with diameters larger than about 2 to 3 microns in their largest dimension increases.

Fibrous particles having lengths generally greater than about 5 microns and diameters generally less than about 1 micron produce pastes which are smooth but dilatant as more force is applied between the tongue and palate, an increasing sense of solid substance is perceived. As fibers become shorter approaching spherical shapes, this character decreases.

The shapes of particles are also important as particles which are generally spheroidal tend to produce a smoother, more emulsion-like organoleptic sensation. Where increased proportions of macrocolloid particles are generally spheroidal or where the macrocolloid particles are more perfectly spheroidal, it may occur that somewhat greater proportions of particles may have diameters greater than about 2 microns without the detriment to the organoleptic character of the macrocolloid mixture. As alluded to hereinbefore, however, rod-like particles with diameters greater than about one micron tend to produce a chalky to powdery mouth feel.

Particle sizes of about 0.1 microns contribute a greasy mouth feel which may be objectionable if it is perceived as the dominant tactile characteristic. Because the perceived transition between an emulsion-like mouth feel and a greasy mouth feel appears to be much more gradual than is the transition between the former and the chalky mouth feel, greater proportions of particles on the order of 0.1 microns in diameter are acceptable in macrocolloids employed according to the present invention. Thus, provided that the mean particle size is not less than 0.1 microns, the emulsion-like character is dominant, notwithstanding that the distribution itself may include a substantial proportion of individual particles having diameters smaller than 0.1 microns.

Proteins useful in preparation of macrocolloids include those from such varied and diverse sources as vegetable whey from oil seeds, mammalian lactations, blood serum and avian ova. Preferably, the present process relates to proteins which are globular proteins when in their native state. From the perspective of traditional protein classification, useful proteins include those which are soluble in aqueous solvent systems and are selected from amongst the simple, conjugated and derived proteins. Suitable simple proteins include: albumins, globulins and glutelins. Suitable conjugated proteins include: nucleoproteins; glycoproteins and muccoproteins, (also known collectively as glucoproteins); phosphoproteins (sometimes themselves classed as simple proteins); chromoproteins; lecithoproteins; and, lipoproteins. Heat-coagulable drived proteins are also suitable.

Simple proteins not useful are the albuminoids (a.k.a. scleroproteins) such as elastins, keratins, collagens and fibroins, all of which are insoluble in their native states. Protamines (a.k.a. protamins) and histones are not heat coagulable and are therefore unsuitable as raw materials for heat denaturing processing.

Conjugated proteins which are both soluble and heat coagulable are useful. Similarly, derived proteins (i.e., the products of various proteoclastic or denaturing processes) which, notwithstanding their derivation, remain both soluble and heat coagulable, are also useful as raw materials, provided, of course, that they are not, by virtue of their derivation, rendered, ab initio, incompatible with the manifestation of the desired, organoleptic properties in the final product of the present process. In general, however, many proteins, metaproteins (a.k.a. infraproteins), coagulated proteins, proteoses, peptones and peptides (a.k.a. polypeptides) lack one or both of these prerequisite characteristics.

The preferred protein for a use in the present invention may vary according to considerations of availability, expense, and flavor associated with the protein as well as the nature of impurities in and other components of the protein source. Preferred proteins include globular proteins such as bovine serum albumin, egg albumen and soy protein, with dairy whey and egg albumen proteins being particularly preferred. Sources of proteins which may be subject to treatment often comprise various impurities. It is desirable therefore that where proteins useful with the invention are naturally associated with insoluble components, such components be smaller than the 3.0 micron limit or be removable prior to processing or rendered smaller than that limit in the course of processing.

Once a specific protein source is selected, the protein solution is treated for relatively short times to relatively specific temperature, shear and pH conditions. Depending on the protein, the presence of specified amounts of polyhydroxy compounds (e.g., sugars), aggregate blocking agents and other optional ingredients will assist in optimizing the yield of desired products. The macrocolloids are produced according to a controlled heat denaturation process during which high shear is utilized to prevent the formation of any significant amounts of large particle size protein aggregates. The denaturation process is carried out at a pH less than the midpoint of the isoelectric curve of the selected protein and preferably at a pH about 1 pH unit below the midpoint of the isoelectric curve. The process may be carried out at lower pHs with the requirement that the processing pH should not be so low as to result in acid degradation of the protein and the limitation that the pH should generally not be less than about 3.

The precise temperatures and shear conditions applied in macrocolloid preparation are routinely selected and extend out for times sufficient to form denatured proteinaceous macrocolloidal particles which are greater than about 0.1 microns in diameter while avoiding the formation of any substantial amounts of fused particulate proteinaceous aggregates in excess of about 2 microns. Preferred shear conditions for processing a given protein solution are best determined by using "oversize" particle teting.

Particle size testing provides a measure of organoleptic quality of the products of the present invention.

One of the simplest and most rapid of the techniques available to a man skilled in the art involves the preparation of an optical slide in a manner which is analogous to the preparation of clinical blood smears. Pursuant to this method, an appropriate dilution of the dispersed macrocolloid is first prepared and adjusted to a pH preferably in the range of 6.5 to 7. High speed magnetic stirring, ultrasonication or homogenization is then applied to fully disperse any weak associations there might be between the individual macrocolloid particles. A small amount (e.g., 8 microliters) of the diluted, neutralized dispersion is then applied to a glass microscope slide of the variety often used in biological studies, and allowed to dry. The sample is viewed under known magnification using "ruled" occular eyepieces with well-known methods. The dispersed macrocolloid particles of the sample is then visually compared with the reticules on the occular to provide a good estimation of the statistical incidence of oversize or aggregated particles within the population as a whole.

An alternative means for analyzing particle size distributions involves the use of an image analyzing computer, for example, a QUANTIMET ™ 720 available from Cambridge Institute, U.K.

Another means involves the use of the MICRO-TRAC ™ particle size analyzer. The general aspects of this technique are described in an article entitled "Particle Size Analysis and Characterization Using Laser Light Scattering Applications" by J. W. Stitley, et al. in *Food Product Development*, December, 1976.

As will be apparent to a man skilled in the art in light of the instant disclosure, sedimentation techniques may also be utilized for the purpose of rendering particle size determinations. It will be appreciated, however, that gravimetric techniques must take into account the protective colloid effects of, for example, whatever processing aids may have been used during the above-described heat denaturation treatment. One example of a gravimetric determination of the percent "oversized" protein aggregate is summarized hereinbelow:

1. A 5% weight by weight dispersion of the macrocolloid of the present invention is prepared and neutralized to a pH of between 6.5 and 7;
2. A high fructose corn syrup having a specific gravity of 1.351, a pH of 3.3, a total nitrogen of 0.006% and a solids concentration of about 71% is added in a 1 to 4 weight by weight ratio to the neutralized 5% macrocolloid dispersion;
3. The mixture is then homogenized to disperse loose associations between the macrocolloid particles;
4. The mixture is then centrifuged at 478 gravities for 20 minutes at about 15 degrees Centigrade. The oversized protein aggregates, i.e., particles having a diameter substantially greater than 2 microns, can be expressed as a percentage of the weight of the protein contained in the centrifuged pellet divided by the weight of the protein contained in the macrocolloidal dispersion prior to centrifugation.

These tests are applicable in respect of both the macrocolloidal dispersions and the protein materials useful as raw materials in the production of said macrocolloids. As will be readily apparent to a man skilled in the art, capacitance based particle size analysis equipment such as, for example, the well known CoulterCounter ™ analyzers will not be suited to the present application, having regard to the charged nature of the macrocolloid particles at certain pH's.

In accordance with the preferred macrocolloid preparative processing conditions, however, the aqueous protein solution is subjected to high temperatures for a very short time at shear rates of 7,500 to 10,000 reciprocal seconds or greater. For a one gallon Waring blender drive equipped with a miniaturized (e.g., 1 litre capacity) "Henschel" mixer, for example, a processing speed of 5000 rpm has been found to provide sufficient shear.

Preferred processing temperatures range from about 80° C. to about 120° C. with processing times ranging from about 3 seconds to about 15 minutes or longer with times of from about 10 seconds to about 2 minutes being preferred. Processing times are longer at lower temperatures, with treatment at 80° C. requiring as much as 15 minutes while processing times at temperatures between 90° C. and 95° C. being about five minutes. By contrast, at 120° C. the processing time may be only about 3 seconds. High processing temperatures are complemented by increased rates of heat transfer. Where the nature of the processing equipment permits, therefore, processing at high heat transfer rates/high denaturation temperatures for very short times is preferred. It should be noted, however, that at temperatures higher than 120° C. with correspondingly reduced product residence times, the resulting macrocolloid product is "thinner" and may be less desirable.

Processes for the production of the macrocolloids utilize an aqueous protein solution characterized by having a protein concentration between about 10% by weight and 20% by weight with protein concentrations between about 15% by weight and 18% by weight being preferred. At protein concentrations less than about 10% by weight, stringy masses tend to form which have undesirable organoleptic qualities. Solutions having protein concentrations much in excess of about 20% by weight tend to become extremely viscous rendering impractical the application of requisite rates of shear to the protein solutions.

The aqueous protein solutions may further comprise up to 100 parts by weight (of protein) or more of a polyhydroxy compound, preferably a mono- or di-saccharide. These compounds may be "naturally" present in the protein starting materials (e.g., lactose present in sweet dairy whey protein concentrates) or added to the solutions prior to denaturation processing. Preferred polyhydroxy compounds include reducing sugars such as lactose, glucose, fructose and maltose, with lactose being particularly preferred. Suitable non-reducing sugars include sucrose and lactitol.

The high level of shear useful in the preparative processing is believed to prevent the formation of large denatured protein aggregates during denaturation. Aggregate blocking agents may optionally be added to the aqueous solutions to facilitate production of desired products. The aggregate blocking agent be selected or adjusted in concentration so that it does not in turn alter the pH of the mixture to outside of the optimal processing specifications. Suitable aggregate blocking agents include hydrated anionic materials such as xanthan gum (ordinarily included at 0.1% to 1.0% by weight of the protein concentrate), datem esters (0.5% to 2.0% by weight of the protein concentrate despite the fact that datem esters tend to contribute an off-flavor to the final product) and lecithin (1% to 10% by weight of the protein concentrate). Other suitable aggregate blocking agents include carrageenan, alginate and calcium steroyl lactylate.

Malto-dextrins produced by enzymatic or acid hydrolysis of starch provide another chemical aggregate blocking agent useful in practice of the invention. The preferred concentration is from 10% to 50% by weight of the protein concentrate. These materials are believed to have a protein-sparing effect, as does high fructose syrup, although the latter is not as efficient as the former in this regard. It will be appreciated that these blocking agents are carbohydrates and hence are a source of calories, a factor which may mitigate against their selection for use in applications such as reduced calorie foods.

Hydrated lecithin and hydrated xanthan gum exemplify the differing effects of different blocking agents. Both impart lubricity to the mouth feel of the final product. Lecithin, however, being a slightly less effective blocking agent, produces a slightly larger average size macrocolloid particle. Those macrocolloid particles produced with xanthan aggregate blocking agent, however, are smaller and smoother particles. Both of the foregoing have a whitening effect on the final product in that they seem to assist in creating a more uniformly dispersed system thereby increasing the light scattering effect which is perceived as whiteness. Combinations of aggregate blocking agents also have been found to have useful attributes.

Other optional ingredients such as salts and end product components including suitable flavors, colors and stabilizers may generally be present in or added to the solution without adverse effect. In many cases (i.e., where the nature of the additive and its influence on the protein solution permits), it may be particularly desirable to include such end product components in the protein solution in order to avoid the need for subsequent, additional pasteurization steps following processing.

Protein starting materials may optionally be treated to remove cholesterol, fat and other impurities which may introduce off-tastes to the macrocolloid product. One such procedure comprises an extraction step wherein the protein material is contacted with a food-grade solvent which is preferably ethanol in the presence of a suitable food-grade acid. The protein material is then subjected to several wash and filtration steps to render the extracted protein product.

Suitable solvents include lower alkanols, hexane or the like, with ethanol being particularly preferred. Suitable food-grade acids include mineral acids such as phosphoric, and food grade organic acids such as acetic, citric, lactic, and malic with citric acid being particularly preferred.

The extraction procedure is particularly useful for the removal of cholesterol and fat from protein sources such as whey protein concentrate. In preferred extraction procedures providing optimal elimination of fat and cholesterol, the whey protein concentrate is extracted at 52° C. for six hours with a mixture of 90-97% alcohol (preferably about 90% ethanol), 3-10% water (preferably about 9%) and about 0.01-0.20% acid (preferably about 0.084% citric acid). In alternative practices providing highly desirable flavor and processing characteristics, the whey protein concentrate is extracted at 40° C. for four hours with a mixture of ethanol, water and citric acid with respective concentrations of 94.95, 5.0 and 0.05 percent. According to such procedures, whey protein concentrate comprising as much as 4.0% fat and 0.15% cholesterol prior to the extraction step comprised less than 2% fat and less than 0.02% cholesterol after such an extraction step.

Once the heat denaturation process is completed, the product may, optionally, be subjected to a homogenization treatment. Such a treatment is desirable in the case of products which are dilute (i.e., having a lower protein concentration) and/or neutralized, such as coffee whiteners for example. This treatment is useful in disrupting the relatively loose, inter-particle associations which occasionally form during processing. While not aggregated, (i.e., not fused into particles of substantially larger than 2 microns in diameter) those of the macrocolloids which are associated with one another (i.e., usually in doublets or triplets) are nonetheless organoleptically perceived as single composite particles which cannot be differentiated from aggregates on the basis of their respective mouth feels. The homogenization treatment divides these associations of particles into individual macrocolloidal particles having the desired mouth feel attributes. The homogenization treatment of dilute products having low macrocolloid concentrations (e.g., coffee whiteners) is preferably carried out at about a pH of 6 to 7. At such pH values, the distribution of electrical charges on the surfaces of the macrocolloids helps maintain an even dispersion of the macrocolloids in the aqueous medium. While any of the traditional homogenization treatments known in the art may be employed to this end, reasonable care must be taken to avoid exposing the macrocolloidal particles to such elevated temperatures as may cause them to aggregate to larger particles.

Particle size testing provides a measure of organoleptic quality of the products of the present invention. One of the simplest and most rapid of the techniques involves the preparation of an optical slide in a manner which is analogous to the preparation of clinical blood smears. Pursuant to this method, ten (10) grams of a paste-like food sample is weighed into a Waring blender and 190 grams of distilled water is added to make a 5% solution. The solution is then blended at high speed for 2 minutes and the pH-adjusted to 6.75-7.0. The sample is then subjected to high speed magnetic stirring during sonication for 1 minute using a probe sonicator (Braunsonic Model 2000 Sonicator, Burlingame, CA). This procedure breaks up any weak associations that might exist between the individual macrocolloid particles. The solution is then diluted further with deionized water to between 0.25% and 0.50% depending on particle concentration. This solution is then placed in an ultrasonic bath (Branson 2200 Ultrasonic Bath, Shelton, CN) for 1 minute immediately before slide preparation.

After shaking by hand for 10 seconds, 20 $\mu$l of the sample, as prepared above, is placed on the center of a microscope slide which has been placed in a Corning slide spinner. The slide is spun immediately after the sample has been placed on the slide. As soon as the slide is dry, usually within about 30 seconds, it is ready for microscopic evaluation.

The sample is observed with Zeiss Axiomat Microscope equipped with a halogen light source (Zeiss, Thornwood, NY) and a Dage MTI video camera (Michigan City, IN) and camera control using a 50X objective and a total magnification ranging between 1000 and 1600. The system is only capable of performing quantitative analysis on particles with diameters greater than about 0.25 microns. For this reason, all statistical measures of particle size herein, unless otherwise noted, refer to particles having major dimensions exceeding 0.25 microns. Nevertheless, particles between about 0.10 microns and about 0.25 microns may be viewed by an observer and their presence is routinely noted. Numerous fields (15 to 25) are scanned to subjectively evaluate the overall size and shape homogeneity/heterogeneity of the sample. Subsequent to qualitative evaluation of the sample, a field is chosen which appears to be representative of the entire sample. This image is then projected on a high resolution black and white television monitor (Lenco, Jackson, MO) for quantitative analysis.

The image on the television monitor is first digitized and is then translated from the television monitor to the computer monitor. During this digitization/translation step, the image is slightly reduced with the side effect that some of the particles that were separate on the original image become fused together and are thus not representative of the true particles. These apparently fused particles are then carefully edited out by comparing the old (television monitor) image to the new (computer monitor) image.

Approximately 250±50 particles are typically measured in one field. As many fields are scanned as are necessary to include 500 particles in the evaluation. Initially the number of particles in the image is determined along with their corresponding lengths and breadths. From this data, two additional variables, equivalent spherical (E.S.) diameter and volume, are calculated as follows:

E.S. Diameter=$(B^2 \times L)^{\frac{1}{3}}$
E.S. Volume=$4/3 \Pi B^2 L$.

Where B equals breadth and L equals length.

When E.S. Diameter and Volume have been determined for the entire distribution of particles in the image, number-weighted ($D_n$) and volume weighted ($D_v$) means E.S. diameters are calculated. $D_n$ is a number averaged particle size diameter which is calculated by summing the diameter of all particles in the distribution and dividing by the total number of particles. The $D_v$ (volume weighted means diameter) weights each particle in relation to its volume and thus provides an indication of where the mean diameter lies on the basis of volume or implicitly of mass. Maximum Diameter ($D_{max}$) is simply the diameter of the largest particle present in the microscopic field.

This data can be plotted in the form of a histogram plot with E.S. diameter on the abcissa as a function of the number of particles as well as volume of particles. From these data, the percentage of particle volume over 2 microns as well as the maximum particle size diameter can also be directly determined.

The following examples 1 through 6 relate to preferred methods and procedures for the preparation of macrocolloids for practice of the present invention. Example 1 relates to a preferred method for the production of macrocolloid material extracted from whey materials. Example 2 relates to the production of macrocolloid material from bovine serum albumin. Example 3 relates to the production of macrocolloid material from egg white albumen while Example 4 relates to the use of soy protein to form macrocolloid materials. Example 5 relates to preparation of ice creamlike frozen desserts wherein macrocolloid products such as those of Examples 1-4 are incorporated in ice cream premix formulations in place of the butterfat component ordinarily incorporated. Example 6 relates to ice cream-like products prepared from premixes wherein heat coagulable protein are included and denatured protein particles in appropriate numbers and within the desired size ranges are formed in situ during pasteurizing/blending processing of the premix.

EXAMPLE 1

An extraction procedure was carried out for the removal of fat and cholesterol from the whey protein concentrate (WPC) protein source prior to denaturation processing. More specifically, a reactor was charged with 181 kg of absolute ethanol (Lot Nos. 16468x, 16995x, Aaper Alcohol & Chemical Co., Shelbyville, KY). Water (8.58 kg) and 10% citric acid solution (954 grams, Miles, Elkhart, IN) were then added and the solution was agitated for about two minutes. The pH of the solution was then measured to confirm that it was pH 5.0±0.5.

One hundred and forty pounds (63.5 kg) of whey protein concentrate WPC-50 (lot 6302-2 Fieldgate, Litchfield, MI) was then added to the reactor and the reactor was sealed. Steam was then admitted to the reactor jacket and the reactor temperature was maintained at 40°–42° C. for 4 hours. The protein slurry was removed from the reactor and filtered on a continuous belt filter allowing the cake thickness to reach 1 inch. The collected cake weighed 116 kg. The reactor was charged with 127 kg of 95% ethanol and the wet cake was added to the reactor to form a slurry which was mixed for 20 minutes. The slurry was then removed, filtered as before, and the collected cake was again added to the reactor charged with 127 kg of 95% ethanol. The slurry was mixed for 20 minutes and was then filtered with care taken to remove as much liquid as possible. The wet cake weighed 104.5 kg.

The wet cake was then placed in trays to a uniform depth of 1 inch or less. The material was then dried under vacuum for 12 hours at temperature of 45°±1° C., providing 51.5 kg of WPC material for a yield of 80.9%. Calculating that approximately 3.5 kg of material had been lost in the dryer, the percentage of volatiles in the initial wet cake was calculated to be 47.4%.

The resulting material had a protein concentration of 56.91% and a solubility of 93% measured according to the solubility determination method described above. The protein was then employed to make up a formulation which included lecithin ("Lecigran F", Riceland, Little Rock, AR), 37% Food Grade hydrochloric acid (J. T. Baker, Phillipsburg, NJ), xanthan ("Keltrol T", Kelco, San Diego, CA) and water.

TABLE 1

| Whey Protein Formulation | | |
|---|---|---|
| Ingredient | % | Wt. (g) |
| WPC-50 | 34.500 | 690.00 |
| Lecithin | 0.932 | 18.64 |
| Hydrochloric Acid | 1.590 | 31.80 |
| Xanthan | 0.186 | 3.72 |
| Water | 62.792 | 1255.00 |
| | 100.000 | 2000.00 |

The components of the formulation listed in Table 1 above were added to a high shear mixer and deaerator (Kady Mill, Scarborough, ME) in the following order: water, hydrochloric acid, lecithin, xanthan and whey protein concentrate. The mixture was deaerated, with care taken to minimize the conversion of mechanical energy to heat, before being introduced into batch process apparatus of the previously mentioned U.S. Pat. application Ser. No. 127,710. The processing vessel was then filled with the premix which had a pH of 4.15, sealed and the temperature recorded was turned on. The motor was activated, and the speed of the blade was adjusted to 5,080 rpm. After a few seconds, heating fluid with a temperature of 100° C. was circulated through the jacket of the vessel. The product reached a temperature of 122° C. in 4.3 minutes, at which time the heating fluid was displaced by a flow of cold water which cooled the product to 40° C. within 2 minutes.

The product obtained from the above process was then evaluated for its organoleptic and physical characteristics. The product had a smooth and creamy consistency with 64% of the protein converted to macrocolloid particles with 0% of the produced particles having dimensions exceeding 3 microns. The spherical particles had a volume-weighted mean diameter ($D_v$) of 0.99 microns, a mean particle size diameter ($D_n$) of 0.78 microns and a maximum diameter ($D_{max}$) of 1.50 microns.

EXAMPLE 2

In this example, bovine serum albumin (BSA) was used to produce a protein macrocolloid product. Bovine serum albumin identified as "Bovine Albumin, Fraction V" was obtained from U.S. Biochemical Corp. (Cleveland, OH). The material was a lyophilized powder with a 97% protein content and a solubility of 99% according to the solubility determination method described above. Other formulation ingredients included lecithin ("Lecigran F", Riceland, Little Rock, AR), 37% Food Grade hydrochloric acid (J. T. Baker, Phillipsburg, NJ), Xanthan ("Keltrol T", Kelco, San Diego, CA), lactose (alpha-lactose monohydrate, Sigma St. Louis, MO) and water.

TABLE 2

| Bovine Serum Albumin Formulation | | |
|---|---|---|
| Ingredient | % | Wt. (g) |
| BSA | 13.080 | 121.64 |
| Lecithin | 2.100 | 19.53 |
| Hydrochloric Acid | 0.770 | 7.16 |
| Xanthan | 0.200 | 1.86 |
| Lactose | 7.560 | 70.31 |
| Water | 76.290 | 709.50 |
|  | 100.000 | 930.00 |

The formulation listed in Table 2 above was prepared in a high shear mixer and deaerator (Kady Mill, Scarborough, ME) with the xanthan gum having been prehydrated. In order, water, hydrochloric acid, lecithin, xanthan, lactose and BSA were added to the mixer and the mix was deaerated before being introduced into the processing apparatus as in Example 1. The processing vessel was filled with the premix which had a pH of 4.19, sealed and the temperature recorder was turned on. The motor was activated, and the speed of the blade was adjusted to 5,080 rpm. After a few seconds, heating fluid with a temperature of 80° C. was circulated through the jacket of the vessel.

The product reached a temperature of 126° C. in 4.8 minutes, at which time the heating fluid was displaced by a flow of cold water. The product was cooled to 40° C. within 2 minutes. The shear rate of this processor is reflected in the 46° C. difference between the temperature of the product and the temperature of the heating fluid. This additional heat had been derived from the conversion of mechanical energy to heat at the rate of about 380 J/sec.

The product obtained from the above process was then evaluated for its organoleptic and physical characteristics. The product had a thick consistency similar to the macrocolloid material produced from whey protein concentrate, and a creamy texture with high lubricity. 71% of the protein had been converted to macrocolloidal particles. The particles were dominantly spheroidal although some rod-like and fibrous particles persisted. These rods and fibers having dimensions exceeding 3 microns accounted for 2.25% of the particles by number. When the rods and fibres were excluded from the microscopy-image analysis, the spheroidal particles had a volume-weighted mean diameter ($D_v$) of 1.03 microns, a means particle size diameter ($D_n$) of 0.66 microns and a maximum diameter ($D_{max}$) of 1.75 microns.

EXAMPLE 3

In this example, egg white albumen was used to produce a protein macrocolloid product. It was determined that a combination of fresh egg white and spray dried egg white would produce the desired product. Fresh egg white was separated manually on the day the premix was prepared from fresh eggs purchased locally. This egg white was determined to include 98% soluble protein but the protein concentration was less than 10%. Due to the initial protein concentration, processing of fresh egg white alone, can give rise to stringy masses of denatured protein product. Spray dried egg white was obtained from Henningsen Foods (White Plains, NY) (Type P-110 egg white solids) with 80% minimum protein. The protein solubility of the spray dried egg white powder was only 83% and processing of this material alone can generate an unacceptable number of oversize particles. In order to avoid the limitations of using each of the materials alone, the fresh and spray dried egg white materials were combined to provide a suitable egg albumen protein source.

Lecithin, xanthan, hydrochloric acid and lactose were obtained from the sources cited in Example 1 and were utilized in the amount listed in Table 3 below.

TABLE 3

| Egg White Albumen Formulation | | |
|---|---|---|
| Ingredient | % | Wt. (g) |
| Fresh Egg white | 70.21 | 1168.92 |
| Spray Dried Egg White | 13.44 | 223.72 |
| Lecithin | 2.97 | 49.54 |
| Xanthan | 0.30 | 4.95 |
| Hydrochloric Acid | 2.37 | 39.43 |
| Lactose | 10.71 | 178.35 |
|  | 100.00 | 1664.91 |

Fresh egg white, lecithin, xanthan, lactose, spray dried egg white and hydrochloric acid were added in sequence and in the amounts specified in Table 3 to a high shear mixer where they were mixed and deaerated. The resulting premix had a pH of 3.6 and was introduced into the processing apparatus as in Example 1. The processing was carried out with a bath temperature of 80° C. and was continued for 4.33 minutes with the blade speed set at 5,080 rpm. The maximum product temperature was 125° C.

The product obtained from the above procedure was thick and creamy. 88.9% of the protein had been converted to macrocolloidal particles which had a pronounced tendency to loosely aggregate. Particle size analysis showed that the particles were within the desired size range with a $D_v = 1.22$ microns and with 4% of the particles over 2 microns. Substantially all particles were spheroidal.

EXAMPLE 4

In this example, soy protein was used to produce a protein macrocolloid product. Soy protein was obtained from Ralston Purina (SN 1631-32-1, St. Louis, MO) which had a protein content of 61.4% and a solubility of 81% according to the method cited above. Lecithin, xanthan, hydrochloric acid and lactose were obtained from the sources cited in Example 1 and were utilized in the amounts listed in Table 4 below.

TABLE 4

| Soy Protein Formulation | | |
|---|---|---|
| Ingredient | % | Wt. (g) |
| Soy Protein | 22.036 | 99.16 |
| Lecithin | 3.000 | 13.50 |
| Xanthan | 0.100 | 0.45 |
| Hydrochloric Acid | 2.196 | 9.88 |
| Lactose | 10.800 | 48.60 |

TABLE 4-continued

| Soy Protein Formulation | | |
|---|---|---|
| Ingredient | % | Wt. (g) |
| Water | 61.868 | 278.41 |
| | 100.00 | 450.00 |

The mix was prepared by adding water, hydrochloric acid, lecithin, xanthan, lactose and soy protein in sequence to a high shear mixer where they were mixed and deaerated. The resulting premix had a pH of 3.74 and was introduced into the processing apparatus of FIG. 1. The bath temperature was kept at 110° C. Heating was continued for 4.30 minutes with the speed set at 5,080 rpm. The maximum temperature reached by the product was 119° C.

The product developed a light tan color during cooking and was smooth, creamy, and thick with a somewhat beany taste typical of soy products. 71% of the protein was converted to macrocolloidal particles. Particle size analysis showed that the particles were within the desired size range, with a $D_v$ of 1.46 microns and a $D_{max}$ of 2.5 microns. Substantially all particles were spheroidal.

EXAMPLE 5

An ice cream-like frozen dessert was produced utilizing whey macrocolloid product according to the following procedure. One hundred and forty pounds of WPC-50 whey protein concentrate (Fieldgate brand, First District Assoc., Litchfield, MN 55355, lot 6302-2) was subjected to the extraction procedure according to Example 1. One hundred and seventeen pounds of extracted protein was recovered. The extracted whey material was 97.6% soluble (according to the method disclosed above), had a protein content of 56.7%, a fat content of 1.9% and a cholesterol content of 53.1 mg/100 grams.

The extraction-treated whey protein concentrate was then mixed thoroughly in a blender with lecithin ("Lecigran F", Riceland, Little Rock, AR), 37% Food Grade hydrochloric acid (J. T. Baker, Phillipsburg, NJ), xanthan ("Keltrol T", Kelco, San Diego, CA) and water in proportions according to Table 5 below to produce a protein premix with a pH of 4.28.

TABLE 5

| Whey Protein Formulation | | |
|---|---|---|
| Ingredient | % | Wt. (pounds) |
| WPC-50 | 34.500 | 48.300 |
| Lecithin | 0.932 | 1.305 |
| Hydrochloric Acid (37%) | 1.595 | 2.233 |
| Xanthan | 0.186 | 0.260 |
| Water | 62.787 | 87.902 |
| | 100.000 | 140.000 |

The protein premix was deaerated and charged at a rate of about 55 pounds per hour to a pair of votator scrape surface heat exchangers (3" × 12") (Chemetron Corp., Louisville, KY) operated at 980 RPM. The product was introduced into the first heat exchanger at about 60° F. and the temperature was steadily increased to about 190° F., whereupon the product was transferred by piping to the second heat exchanger for cooling to about 70° F. The processing device was operated for about three hours and twenty minutes with samples taken for analysis at various times. The macrocolloid samples were subjected to size and other types of analysis with the results presented in Table 6 below. Viscosity was determined using a cone and plate viscosimeter (Haake, Saddlebrook, N.J.).

TABLE 6

| Sample No. | Time | Product Temp. (°F.) | Flow Rate (lbs/hr) | Viscosity (cps) | Dn (microns) | Dv (microns) | Dmax (microns) | Comments |
|---|---|---|---|---|---|---|---|---|
| | 0:00 | 182 | 55 | 227 | 0.70 | 1.06 | 1.75 | |
| 2 | 0:03 | | | | | | | |
| 3 | 0:11 | | | | | | | |
| 4 | 0:30 | | | | | | | |
| 5 | 0:33 | 183 | 55 | | | | | |
| 6 | 1:00 | 184 | 55 | 246 | 0.74 | 1.05 | 2.00 | |
| 7 | 1:02 | | | | | | | |
| 8 | 1:10 | | | | | | | |
| 9 | 1:39 | 187 | 55 | 407 | 0.76 | 1.22 | 2.00 | |
| 10 | 1:41 | | | | | | | |
| 11 | 1:49 | | | | | | | |
| 12 | 2:18 | 190 | 55 | 283 | 0.78 | 1.14 | 2.00 | |
| 13 | 2:44 | 190 | 86 | 266 | 0.85 | 1.30 | 2.50 | |
| 14 | 2:47 | | | | | | | |
| 15 | 3:01 | 199 | 86 | 278 | 0.73 | 1.16 | 2.00 | poor quality |
| 16 | 3:15 | | | | | | | |
| 17 | 3:20 | 187 | 55 | 258 | 0.79 | 1.30 | 2.00 | |

Whey macrocolloid protein product produced coincident with sample 7 was then used to produce an ice cream-like frozen dessert. The "ice cream" formulation comprised 2,200 grams of whey macrocolloid product as a substitute for heavy cream in a formulation comprising condensed skim milk (30% solids), sucrose (Bakers Special), stabilizer (Fanci Freeze 1065, Celanese Corp., Louisville, KY.), sodium hydroxide solution and water.

The ingredients of Table 7 were mixed in the following order. The sucrose and stabilizer were dry blended and added to a mixture of water (1,976.7 grams) and condensed skim milk while being subjected to high shear mixing to yield a sucrose/stabilizer/milk solids component. The whey macrocolloid was diluted with water (550 grams) and then combined under high shear mixing conditions with a diluted mix of sodium hydroxide and water (110 grams) to form a neutralized macrocolloid "cream". The final mixture was then formed by addition of the macrocolloid "cream" to the sucrose/stabilizer/milk solids component.

TABLE 7

| Ice Cream Formulation | | |
|---|---|---|
| Ingredient | % | Wt. (grams) |
| Sucrose | 19.60 | 2,156 |
| Stabilizer | 0.40 | 44 |
| Condensed skim milk | 25.86 | 2,844.6 |
| Water | 17.97 | 1,976.7 |
| Whey Macrocolloid | 20.00 | 2,200 |
| Water | 5.00 | 550 |
| NaOH solution (10%) | 1.17 | 128.7 |
| Water | 10.00 | 1100 |

The mix was pre-heated to 135° F. in a pasteurizer (APV plate heat-exchanger, APV, Tonawanda, N.Y.), homogenized, pasteurized at 155° F. for 30 minutes, cooled to 52° F. and aged overnight prior to freezing. The "ice cream" mix was then flavored with sliced freeze dried strawberries and strawberry and vanilla flavor to produce a strawberry ice cream. The ingredients were mixed by hand in proportions according to Table 8.

TABLE 8

| Strawberry "Ice Cream" Formulation | | |
|---|---|---|
| Ingredient | % | Wt. (grams) |
| Ice Cream Mix | 98.23 | 4,400 |
| Strawberry Flavor | 0.20 | 8.8 |
| Vanilla Flavor | 0.10 | 4.4 |
| Sliced Freeze Dried Strawberries | 1.47 | 66.0 |
| | 100.00 | 4,479.2 |

The chilled mix was then charged into an automatic ice cream mixer (Coldelite, N.J.) and run for about 20 minutes, whereupon the product (at a temperature of about 18° F.) was removed.

Two runs of the strawberry "ice cream" formulation were produced resulting in 2.9 gallons of finished strawberry "ice cream" characterized by a creamy (not icy) texture. The product was compared against each of two commercial ice cream products in blind comparisons by groups of 60 untrained panelists against two premium brands of strawberry ice cream each comprising approximately 14 to 16% butter fat. In comparisons of texture, the overall appeal of the three products was roughly comparable, while in comparisons of creaminess, smoothness and texture, no significant difference was detected at the $\alpha = 0.05$ significance level as may be seen in the results listed in Table 9 below.

TABLE 9

| | Texture Comparisons of Strawberry Ice Cream | | | |
|---|---|---|---|---|
| | Exemplary Product (n = 26) | Premium Brand No. 1 (n = 26) | Exemplary Product (n = 27) | Premium Brand No. 2 (n=26) |
| Overall Appeal (9 = Like extremely) | 6.7 | 7.7 | 6.7 | 7.1 |
| Creaminess (5 = Much too creamy) | 3.3 | 3.0 | 2.9 | 3.0 |
| Smoothness (5 = Extremely smooth) | 3.9 | 3.9 | 3.6 | 3.9 |
| Texture (5 = Much too dense) | 3.2 | 3.0 | 2.8 | 2.8 |

Three premium grade ice creams and one standard grade (supermarket brand) vanilla ice cream were subject to comparative analysis with a vanilly "ice cream" formulation prepared essentially according to Example 5, using a dairy whey macrocolloid as a complete substitute for milk fat. Results of the comparative analysis are set out in Table 10 below.

TABLE 10

| APPROXIMATE ANALYSIS OF FROZEN DESSERTS Per 100 grams Product | | | | | | | |
|---|---|---|---|---|---|---|---|
| Sample | Protein grams | Moisture grams | Fat grams | Ash grams | C.Fiber grams | Carbohydrate grams | Calories |
| 1. Premium Grade Ice Cream No. 1 | 4.1 | 57.5 | 17.0 | 0.8 | <0.1 | 20.6 | 252 |
| 2. Premium Grade Ice Cream No. 2 | 4.6 | 55.1 | 15.9 | 1.0 | <0.1 | 23.4 | 255 |
| 3. Premium Grade Ice Cream No. 3 | 2.8 | 59.3 | 15.4 | 0.7 | <0.1 | 21.8 | 237 |
| 4. Standard Grade Ice Cream | 3.0 | 62.4 | 9.8 | 0.8 | <0.1 | 24.0 | 196 |
| 5. Example 5 Product | 7.1 | 66.5 | 0.5 | 1.2 | <0.1 | 24.7 | 132 |

EXAMPLE 6

A chocolate-favored ice cream-like frozen dessert according to the invention and involving in situ formation of denatured protein particles was prepared through formulation of a premix of the ingredients set out in Table 11.

TABLE 11

| | Component | Percent By Weight | Percent By Weight Protein |
|---|---|---|---|
| A | Liquid egg white | 40.000 | 4.056 |
| B | Condensed skim milk (30.15% solution) | 26.250 | 2.862 |
| C | Sugar | 16.000 | — |
| D | Water | 7.940 | — |
| E | Non-fat dry milk | 3.700 | 1.338 |
| F | Liquid egg yolk | 0.900 | — |

TABLE 11-continued

| Component | | Percent By Weight | Percent By Weight Protein |
|---|---|---|---|
| G | Citric acid (10% solution) | 1.800 | — |
| H | Frodex 36 (corn syrup solids) | 1.230 | — |
| I | Keltose (alginate) | 0.250 | — |
| J | Locust bean gum | 0.080 | — |
| K | Cocoa (Gerkin's Sienna) | 0.875 | — |
| L | Cocoa (Bensdorp Royal Dutch) | 0.875 | — |
| M | Vanilla | 0.080 | — |
| N | Cream flavor (Naarden) | 0.020 | — |
| | | 100.000 | 8.256 |

A dry blend of components E, H and I, and the sugar component, C, was prepared. The condensed skim milk, B, and water, D, were loaded into a Liquivertor mixing device and the dry blend and other dry ingredients, E, J, K and L were added with mixing to dissolve and disperse all components. The egg yolk, F, was thereafter added with continued mixing. When all components were well dissolved, the liquid egg white, A, was added and mixed briefly, followed by addition of the citric acid solution, G, in a quantity sufficient to achieve a pH for the total mixture of from 6.2 to 6.5. After checking and adjustment of pH as required, the agitator was turned off.

The premix formed above was then subject to pasteurization under high temperature short time (HTST) conditions with agitation and application of high shear forces by two alternate processes. More specifically, about one-third of the mix was initially warmed by charging into a 3"×12" eccentric votator scrape surface heat exchanger operated at a speed of 450 RPM. Upon reaching the temperature of approximately 140° F., the mix was passed into a continuous apparatus as illustrated in FIG. 2 of copending U.S. application Ser. No. 127,710 with the speed of the blade set at approximately 5,000 RPM. Upon attaining a temperature of approximately 180° F., the mix was passed through a ½" OD, ⅜" ID, insulated metal "holding" tube within which the mix temperature was maintained at about 176° F., the mean residence time of the mix passing through the tube being established at about 20 seconds. Post-pasteurization cooling of the mix was accomplished by passage through a first 3"×12" eccentric votator scrape surface heat exchanger operated at about 1000 RPM to effect a temperature drop from 176° F. to 80° F., followed by passage through a 3"×12" concentric votator scrape surface heat exchanger operated at about 300 RPM to effect a temperature drop to about 38° F. Flavorings, M and N, were than added and, after optional aging, the flavored mix was frozen in a conventional ice cream freezer. Use of a freezer unit equipped with a high displacement dasher and characterized by high freezing capacity is preferred.

About two-thirds of the premix was subjected to high shear processing through use of the votator scrape surface heat exchangers alone. More specifically, the mix was processed through a 3"×12" eccentric votator run at approximately 1000–1100 RPM to raise the temperature to approximately 180° F. and the mix was thereafter passed through a holding tube as previously described, allowing for maintenance at 176° F. for a mean time of 20-22 seconds. Passage through a second eccentric votator run at about 1000-1100 RPM allowed for a product temperature drop to about 60° C. and final reduction of product temperature to about 40° F. was effected using the concentric votator run at about 300 RPM. Thereafter, the mix was subjected to further processing as above.

Products produced by the two above high shear pasteurization processes were subject to sensory evaluation and the product of the first sensory evaluation and the product of the first alternative process was somewhat preferred in terms of smoothness, creaminess and texture.

Practice of the invention in developing frozen dessert products through preparation of fat-free or substantially fat-free and coagulable protein rich premixes generally involves provision of premixes which include up to 20 percent by weight protein, of which from 25 to 100 percent is provided in the form of a heat coagulable protein. The Table 11 formulation, for example, results in a premix which comprises 8.256 percent by weight protein. Of this protein, 4.20 percent (derived from the condensed skim milk and Non Fat Dry Milk components) is essentially non-heat coagulable and 4.056 percent (derived from the liquid egg whites) is heat coagulable.

Analysis of the ice cream analog product for presence of denatured protein particles is accomplished as follows. A determination was made of the number of particles having diameters ranging from 0.1 to 3.0 microns which would occupy a one cubic centimeter volume. The calculated values are set out in Table 12 below.

TABLE 12

| Calculated Number Of Particles That Occupy 1 c.c. Volume By Different Particle Sizes | |
|---|---|
| Micron Range | Number of Particles Per c.c. |
| 0.0–0.1 | $1.53 \times 10^{16}$ |
| 0.1–0.2 | $5.66 \times 10^{14}$ |
| 0.2–0.3 | $1.22 \times 10^{14}$ |
| 0.3–0.4 | $4.45 \times 10^{13}$ |
| 0.4–0.5 | $2.09 \times 10^{13}$ |
| 0.5–0.6 | $1.15 \times 10^{13}$ |
| 0.6–0.7 | $6.95 \times 10^{12}$ |
| 0.7–0.8 | $4.53 \times 10^{12}$ |
| 0.8–0.9 | $3.11 \times 10^{12}$ |
| 0.9–1.0 | $2.23 \times 10^{12}$ |
| 1.0–1.1 | $1.65 \times 10^{12}$ |
| 1.1–1.2 | $1.25 \times 10^{12}$ |
| 1.2–1.3 | $9.80 \times 10^{11}$ |
| 1.3–1.4 | $7.76 \times 10^{11}$ |
| 1.4–1.5 | $6.26 \times 10^{11}$ |
| 1.5–1.6 | $5.13 \times 10^{11}$ |
| 1.6–1.7 | $4.25 \times 10^{11}$ |
| 1.7–1.8 | $3.56 \times 10^{11}$ |
| 1.8 × 1.9 | $3.02 \times 10^{11}$ |
| 1.9–2.0 | $2.57 \times 10^{11}$ |
| 2.0–2.1 | $2.22 \times 10^{11}$ |
| 2.1–2.2 | $1.92 \times 10^{11}$ |
| 2.2–2.3 | $1.67 \times 10^{11}$ |
| 2.3–2.4 | $1.47 \times 10^{11}$ |
| 2.4–2.5 | $1.30 \times 10^{11}$ |
| 2.5–2.6 | $1.15 \times 10^{11}$ |
| 2.6–2.7 | $1.03 \times 10^{11}$ |
| 2.7–2.8 | $9.18 \times 10^{10}$ |
| 2.8–2.9 | $8.25 \times 10^{10}$ |

TABLE 12-continued

| Calculated Number Of Particles That Occupy 1 c.c. Volume By Different Particle Sizes | |
|---|---|
| Micron Range | Number of Particles Per c.c. |
| 2.9–3.0 | $7.44 \times 10^{10}$ |

Product samples were subject to analysis using a Horiba particle size distribution analyzer (Model CA-PA700, Horiba Ltd., Miyanohigashi Kisshoin Minami-Ku Kyoto, Japan) to determine the relative proportion of total particles (within the 0.1 to 3.0 micron range) for each micron range indicated in Table 12.

Product samples were also subject to unltracentrifugation analysis using a Beckman Ultracentrifuge (Model No. L8-70M, Beckman Instruments, Inc., Palo Alto, CA.). More specifically, samples were diluted with water to develop 20% dispersions. These were shaken by hand and then sonicated for 30 seconds at 100 watts to uniformly disperse the diluted samples. Thereafter, the diluted samples were centrifuged at 25,000 RPM for 25 minutes at 22° C. using an SW 28 rotor. The volume of the supernatant was then measured and the volume occupied by the particles was determined by subtraction from the original volume to determine the percent of the original, undiluted, sample occupied by the particulate material. For any given sample, the number of particles within any particular size range may be determined by mutiplying the Table 12 value times the size distribution percentage times the percent of the sample occupied by all particles as determined by ultracentrifugation.

As previously indicated, frozen dessert products of the present invention are uniquely characterized by the presence therein of denatured protein particles with diameters within the range of 0.5 to 2.5 microns in numbers in excess of $1 \times 10^8$. It is preferred that products of the invention include $1 \times 10^9$ and up to $1 \times 10^{12}$ or more such particles.

Improved whipped frozen dessert products of the present invention was described above with respect to illustrative "ice cream" formulations are readily seen to constitute products possessing the physical and organoleptic character of full fat products but having substantially lower caloric content and higher quality (i.e., higher protein content) nutritional characteristics. While the above illustrative "ice cream" product formulations include sucrose as a sweetener, it will be understood by those of ordinary skill in the art that numerous high-potency alternative sweetener products such as aspartame, alitame, acesulfame K and sucralose may be employed (together with suitable bulking agents, as required) as a substitute for sucrose in preparation of products according to the invention.

In a like manner, while the above illustrative "ice cream" formulations involve total replacement of milk fat with proteinaceous macrocolloid preparations, it will be understood that high quality products of the invention also include frozen desserts wherein the macrocolloid replaces only part (e.g., 50 percent) of the fat and/or oil ordinarily incorporated. Similarly, while "ice cream" products have been illustrated, the present invention may be advantageously applied to the preparation of reduced fat or non-fat (i.e., containing less than 1 percent fat) whipped frozen desserts such as ice milk, custard, sherbert, and the like.

Numerous modifications and variations in practice of the invention are expected to occur to those of ordinary skill in the art upon consideration of the foregoing descriptions of presently preferred embodiments thereof and, consequently, only such limitations as appear in the appended claims should be placed thereon.

What is claimed is:

1. In a frozen whipped dessert containing fat and/or oil, the improvement comprising the partial or total replacement of fat and/or oil therein by a macrocolloid comprising substantially non-aggregated particles of denatured protein having in a dry state a mean diameter particle size distribution ranging from about 0.1 microns to about 2.0 microns, with less than about 2 percent of the total number of particles exceeding 3.0 microns in diameter, and wherein the majority of said particles are generally spheroidal as viewed at about 800 power magnification under a standard light microscope, the particles in a hydrated state forming said macrocolloid having substantially smooth, emulsion-like organoleptic character.

2. The frozen whipped dessert of claim 1 wherein said macrocolloid replaces dairy fat in the foodstuff.

3. The frozen whipped dessert of claim 1 wherein said macrocolloid replaces greater than 50 percent of the fat and/or oil in the foodstuff.

4. The frozen whipped dessert of claim 1 wherein said macrocolloid totally replaces fat and/or oil in the foodstuff.

5. The frozen whipped dessert of claim 1 which is an analog of ice cream containing less than one percent fat in the foodstuff.

6. The frozen whipped dessert according to claim 1 wherein the macrocolloid comprises a denatured protein selected from the group consisting of dairy whey protein, egg albumen, soy and bovine serum albumin.

7. In a method for preparing a frozen whipped dessert by freezing and whipping a mix of frozen dessert ingredients including fat and/or oil, the improvement comprising partially or totally replacing fat and/or oil in said mix with an effective amount of a macrocolloid comprising substantially non-aggregated particles of denatured protein having in a dry state a mean diameter particle size distribution ranging from about 0.1 microns to about 2.0 microns, with less than about 2 percent of the total number of particles exceeding 3.0 microns in diameter, and wherein the majority of said particles are generally spheroidal as viewed at about 800 power magnification under a standard light microscope, the particles in a hydrated state forming said macrocolloid having substantially smooth, emulsion-like organoleptic character.

8. A low or non-fat frozen whipped dessert comprising water, sweetener, flavoring, stabilizer and protein and wherein said protein provides, per cubic centimeter frozen dessert, at least $1 \times 10^8$ denatured protein particles having diameters in the range of from 0.5 to 2.5 microns.

9. The frozen whipped dessert of claim 8 which comprises from $1 \times 10^9$ to $1 \times 10^{12}$ of said denatured protein particles per cubic centimeter.

10. The frozen whipped dessert of claim 8 which comprises less than 1 percent fat and/or oil.

11. In a method for preparing a frozen whipped dessert wherein an aqueous mix of frozen whipped dessert ingredients is subjected to heat pasteurization prior to freezing, the improvement comprising preparing a substantially fat-free aqueous mix including from 5 to 20 percent protein of which 25 to 100 percent is heat coagulable protein and subjecting said mix to heat pasteurization and high shear conditions to form a pasteurized premix which upon freezing forms a substantially fat-free frozen whipped dessert containing, per cubic centimeter, at least $1 \times 10^8$ denatured protein particles having diameters within the range of 0.5 to 2.5 microns.

12. The method of claim 11 wherein the frozen whipped dessert formed comprises from $1 \times 10^9$ to $1 \times 10^{12}$ of said denatured protein particles per cubic centimeter.

13. The method of claim 11 wherein the frozen whipped dessert formed comprises less than 1 percent fat and/or oil.

* * * * *

UNITED STATES PATENT AND TRADEMARK OFFICE
CERTIFICATE OF CORRECTION

PATENT NO. : 4,855,156
DATED : August 8, 1989
INVENTOR(S) : NORMAN SINGER ET AL.

It is certified that error appears in the above-identified patent and that said Letters Patent is hereby corrected as shown below:

Col. 1, line 55, "Smothness" should be --Smoothness--

Col. 6, line 50, "teting" should be --testing--

Col. 7, line 1, "is" should be --are--

Col. 8, line 38, insert -- should-- after "agent"

Col. 11, line 42, "ice creamlike" should be --ice cream-like--

Col. 12, line 16, insert --a-- after "at"

Col. 13, line 59, "fibres" should be --fibers--

Col. 14, line 20, "amount" should be --amounts--

Col. 16, Table 6, insert --1-- on the first line under the heading "Sample No."

UNITED STATES PATENT AND TRADEMARK OFFICE
CERTIFICATE OF CORRECTION

PATENT NO. : 4,855,156

DATED : August 8, 1989

INVENTOR(S) : NORMAN SINGER ET AL.

It is certified that error appears in the above-identified patent and that said Letters Patent is hereby corrected as shown below:

Col. 18, line 55, "chocolate-favored" should be --chocolate-flavored--

Col. 20, Table 12 (line 60), "1.8 X 1.9" should be --1.8-1.9--

Signed and Sealed this

Twenty-first Day of August, 1990

Attest:

HARRY F. MANBECK, JR.

Attesting Officer

Commissioner of Patents and Trademarks